March 16, 1954

E. ROLF 2,672,584

DIFFERENTIAL APPARATUS FOR THE PROTECTION OF CURRENT CONVERTERS

Filed Oct. 20, 1951

INVENTOR:
ERICH ROLF
BY C. M. Avery
ATT'Y

March 16, 1954　　　　　　E. ROLF　　　　　　2,672,584
DIFFERENTIAL APPARATUS FOR THE PROTECTION
OF CURRENT CONVERTERS
Filed Oct. 20, 1951　　　　　　　　　　　　2 Sheets-Sheet 2

INVENTOR:
ERICH ROLF
BY　　　　　ATT'Y

Patented Mar. 16, 1954

2,672,584

UNITED STATES PATENT OFFICE 2,672,584

DIFFERENTIAL APPARATUS FOR THE PROTECTION OF CURRENT CONVERTERS

Erich Rolf, Nurnberg, Germany, assignor to Siemens-Schuckertwerke Aktiengesellschaft, Berlin-Siemensstadt, Germany, a German corporation Application October 20, 1951, Serial No. 252,316
Claims priority, application Germany
October 28, 1950

14 Claims. (Cl. 321—12)

My invention relates to condition-responsive apparatus for the protection of electric converting equipment, particularly contact rectifiers, and is described hereinafter with reference to the accompanying drawings in which.

For avoiding the detrimental effects of arc-backs and the like disturbances in electric current converters, in particular contact converters, it has become known to provide such converters with a protective apparatus which compares the alternating input current of the converter with its rectified output current and which, in the event of an arc-back, releases a short-circuiting or other switch to stop the converting operation.

Figure 1:
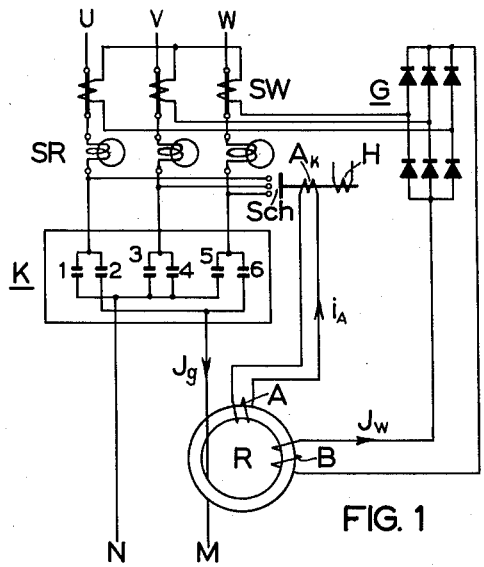
Fig. 1 is explanatory, showing a schematic circuit diagram of a known contact rectifier with differentially controlled apparatus for arc-back protection.

Such a protective apparatus is illustrated in Fig. 1 as part of a multi-phase contact rectifier system. The contact rectifier proper may be of any known design and therefore is only symbolically represented by its contact devices 1 to 6. These contact devices are opened and closed in synchronism with the alternating current to be rectified. As shown, two contact devices, such as those denoted by 1 and 2, are parallel connected in each phase of the alternating circuit. These two contacts close alternately during the respective positive and negative half wave period of the alternating current. The alternating current is supplied through phase conductors U, V, W. The rectified output current passes through a load circuit whose positive and negative buses are denoted by M and N. Connected in each phase of the alternating-current circuit are respective saturable series reactors cummulatively denoted by SR. These reactors reduce the instantaneous current value to a negligible value during recurrent intervals of time near the current zero passages. The contact devices in each phase open and close during these intervals and hence under conditions not apt to cause arcing or sparking.

The rectified output current $J_g$ of the contact rectifier is compared with another direct current $J_w$ by means of a differential annular-core transformer R. The direct current $J_w$ is derived from the secondary windings of a set of current transformers SW which are inserted into the respective phase conductors U, V, W of the energizing circuit, an auxiliary rectifier G being inserted between the current transformers and a primary winding B of transformer R. The transformer R has a secondary winding A connected with a release coil $A_k$ of a switch Sch which is normally held open by a holding winding H and, when closed, short-circuits the phase conductors U, V, and W ahead of the contact rectifier K.

Under normal operating conditions of the contact rectifier, the effects of the currents $J_g$ and $J_w$ upon the core of the differential transformer R are substantially balanced and no voltage is induced in the secondary winding A. That is, the magnitude of the ampere turns or magnetomotive force which the load circuit imposes upon the transformer core is normally equal and opposed to the magnitude of the ampere turns or magnetomotive force with which the winding B acts upon the same core so that no magnetic flux is produced in the core. When this balance in the differential transformer R is disturbed, for instance due to the occurrence of arc-back, the direct current $J_w$ derived from the alternating currents in the phase conductors U, V, W increases very rapidly and the rectified load current $J_g$ commences to decline. As a result, the annular core of transformer R is reversely magnetized and a current pulse $i_A$ is induced in the secondary winding A. This pulse is impressed on the release coil $A_k$ of the short-circuiting switch Sch. The switch then bridges all synchronous contact devices 1 to 6 of the rectifier K thus protecting them from burning and welding so that the disconnection of the converter circuit may be effected in any suitable manner, for instance by an overload breaker (not shown), without placing exacting requirements on the rapidity of the disconnecting performance.

Due to the need for the accessory rectifier apparatus G and the additional set of current transformers SW, a protective apparatus according to Fig. 1 is mainly suitable for converters of large power rating but uneconomical for converters of medium and small power rating.

It is therefore an object of my invention to devise a protective circuit system and device for electric converters which avoids the just mentioned disadvantages by obviating the necessity for current transformers and accessory rectifying devices.

To this end, the invention also provides means for comparing the alternating input current of the converter to be protected with the rectified output current in order to effect a protective release operation in response to the occurrence of a predetermined unbalance condition. According to one of the essential features of the invention, however, the alternating current and the direct current to be compared are conducted through the induction range of closed magnetic circuits to directly affect their flux conditions, the closed magnetic circuits being equipped with the control coils for releasing the short-circuiting switch or other protective circuit control means proper of the alternating-current input circuit.

Figure 2:
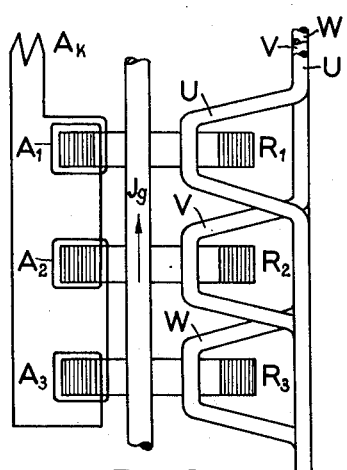
Figs. 2 and 3 show schematically a lateral view and a top view respectively of a protective control device according to the invention.
Figure 3:
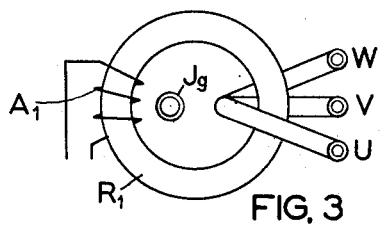

The device shown in Figs. 2 and 3 exemplifies the just-mentioned features and is designed for protecting a three-phase converter system. The device has three laminated annular cores $R_1$, $R_2$, $R_3$ of a magnetizable material, preferably with an approximately rectangular hysteresis characteristic, for instance, of a nickel iron alloy or a silicon iron alloy. One of the two direct current buses of the converter output circuit passes through all three cores so that all three cores are traversed by the load current $J_g$. Also passing through each core is one of the respective three phase conductors U, V, W of the alternating-current input circuit. The three cores are equipped with respective secondary windings $A_1$, $A_2$, $A_3$ which are connected in series with each other to the release coil $A_k$ of the protective switch proper.

The performance of the apparatus according to Figs. 2 and 3 will presently be explained with reference to the Y-connected three-phase contact rectifier system according to Fig. 4. The rectifying units of this rectifier system are represented by the symbols of valve units $K_1$, $K_2$, and $K_3$ because these units may consist of any valve-type devices, such as electronic discharge tubes. However, according to a preferred embodiment, each symbolically indicated unit $K_1$, $K_2$, $K_3$ consists of a series connection of a synchronous contact device with a saturable switching reactor, substantially as explained above in conjunction with the corresponding elements shown in Fig. 1. The system is energized from alternating-current supply leads R, S, T attached to the primary windings of a power transformer $T_r$. The secondary windings of transformer $T_r$ are Y-connected with each other and energize the secondary phase conductors U, V, W. The currents in the secondary phases are rectified by means of the above-mentioned respective converter units $K_1$, $K_2$, $K_3$. The rectified output current $J_g$ is supplied to a load L through a smoothing reactor D. The system includes a device according to Figs. 2 and 3, the pertaining annular cores being shown in Fig. 4 at $R_1$, $R_2$ and $R_3$. The system is further equipped with a short-circuiting contactor $Sch$ normally kept open by a holding coil H and releasable by excitation of a release control coil $A_k$ as explained in conjunction with Fig. 1.

Figure 4:
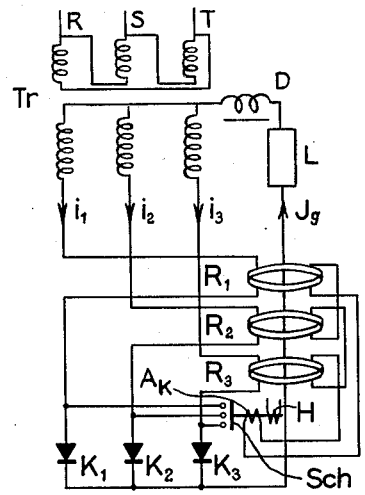
Fig. 4 is a schematic circuit diagram of a three-phase Y-connected rectifier system including a device according to Figs. 2 and 3.
Figure 5:
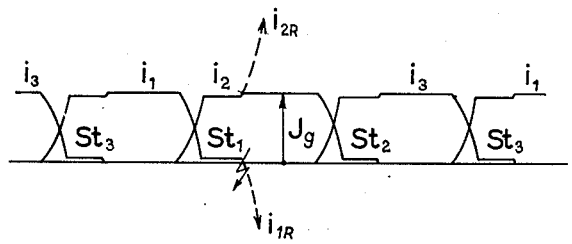
Figs. 5 and 6 are respective coordinate diagrams explanatory of the operation of the rectifier system according to Fig. 4.

In the coordinate diagram of Fig. 5, wherein the abscissa represents time and the ordinate indicates current values, the currents $i_1$, $i_2$ and $i_3$ flowing through the respective valve units $K_1$, $K_2$, $K_3$ of the three phases U, V, W (Fig. 4) are represented by correspondingly denoted curves. During the normal, undisturbed operation of the system, a step of an extremely small current magnitude occurs at the end of each positive current half wave. This step is due to the fact that the series-connected switching reactor becomes unsaturated and assumes a high reactance value when the instantaneous current value drops below a small magnitude occurring shortly before the zero passage.

In Fig. 5, the steps of current curves $i_1$, $i_2$, $i_3$ are indicated at $St_1$, $St_2$, $St_3$ respectively. During the time interval of each step the residual current is small enough to permit opening of the correlated converter contact without sparking. After opening of the contact, the flow of current in the pertaining phase of the rectifier circuit is interrupted until the contact recloses at the beginning of the next positive half wave.

In contrast to the just mentioned normal performance, the occurrence of an arc-back has the effect that, due to some disturbance, the current in a phase is not interrupted at the end of the step interval but continues flowing as a reverse current, for instance, through an arc burning between the now separated contact surfaces of the pertaining converter contact. Assume, for instance, that an arc-back occurs at the termination of the step $St_1$ of the current $i_1$. Then the just mentioned reverse current may correspond to the current curve $i_{1R}$ indicated by a broken line in Fig. 5. This reverse current is supplied from the sequentially next conductive phase of the rectifier circuit, that is by the second phase (V) in the assumed example. Consequently, the forward current of the second phase (V) increases beyond the normal value $i_2=J_g$ in mirrored correspondence to the reverse current $i_{1R}$, as indicated by the broken-line curve $i_{2R}$. The currents $i_{1R}$ and $i_{2R}$ may rapidly increase to high magnitudes because, in contrast to undisturbed operation, the current $i_2$ is no longer limited by the resistance of the external load current but is limited only by the voltage drops in the commutation circuit.

Figure 6:
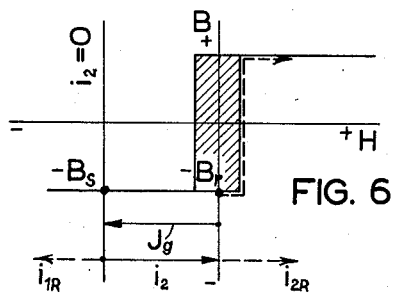

Fig. 6 represents the magnetization phenomena in the annular core $R_2$, on the basis of an ideal rectangular hysteresis characteristic of the core material. During undisturbed operation the core is kept permanently saturated in the negative direction by the rectified load current $J_g$. At those times in which the flow of current in the second phase (V) is interrupted, the field strength corresponds to the vertical line $i_2=0$ and the corresponding operating point on the hysteresis loop is at $-B_s$. During the conductive half-wave period of the second phase (V) the current $i_2$ equals the current $J_g$. Due to the oppositely directed current flow directions, the alternating current thus just balances the direct current as regards their magnetomotive forces effective upon the core, and the operating point is shifted to the remanence point $-B_r$. This is repeated for each current-wave period. The recurrent change between the operating points $-B_s$ and $-B_r$, assuming that a core material of good magnetic quality is used, does not cause an appreciable change in flux so that no voltage is induced in the secondary coil $A_2$ of the core.

As mentioned, the occurrence of arc-back causes the current $i_2$ to rise to $i_{2R}$ while at the first moment the direct current $J_g$ may still be considered unchanged, but thereafter decreases and then further increases the excess value of the current $i_{2R}$. As a result, the core becomes remagnetized along the portion of the hysteresis loop marked by a broken border line. This has the effect of inducing in the secondary coil $A_2$ an electromotive force thus producing a release control current of such a magnitude that this current compensates the algebraic sum of the effective currents to the zero value.

The two other annular cores $R_1$ and $R_3$ are likewise saturated by the direct current $J_g$ at the beginning of the above-considered arc-back. The effect of the current $i_{1R}$ on core $R_1$ is in the saturating direction. Also, in both cores $R_1$ and $R_3$, the current pulse $i_A$ flowing through the secondary windings $A_1$ and $A_3$ is in the saturation stiffening direction. Consequently, in the secondary coils $A_1$ and $A_2$ of cores $R_1$ and $R_3$ no voltage is induced that might oppose the releasing current pulse $i_A$ of coil $A_2$. The increasing releasing current $i_A$ furthermore does not cause a reverse magnetization of these cores but results merely in a voltage drop corresponding to the air inductivity of the secondary coils. Consequently, the control device according to Figs. 2 to 4 is well suitable to advantageously replace the known protective circuit equipment of converters according to Fig. 1 while avoiding the additional current transformers and the accessory rectifier heretofore necessary.

To always secure at the switching-in moment of the contact rectifier a correct direction of saturation in the preferably annular magnet cores forming the magnetic circuits of the control device, these magnet cores may be given a weak premagnetization or bias excitation in the direction of the ascending arc-back current, that is in the direction of the current $J_g$ in the direct-current bus, so that the resultant direct-current field is slightly preponderant over the alternating-current field during the normal, undisturbed operation. For producing such a premagnetization, an auxiliary winding may be provided on each of cores $R_1$, $R_2$, $R_3$. The auxiliary winding may be energized by current from a small auxiliary source of direct current or by current derived from the load circuit of the converter. The latter possibility is also applicable in systems where the load current is interrupted when a given external minimum load is exceeded. This is so because when the core is once correctly polarized, it can even after cessation of the premagnetization be thrown out of this polarity only by the occurrence of a disturbance.

Instead of connecting the secondary coils $A_1$, $A_2$, $A_3$ of the respective annular cores $R_1$, $R_2$, $R_3$ (Fig. 4) in series, these coils may also separately act upon the protective switch, it being then only necessary to equip the contactor with three separate releasing coils. In a system according to Fig. 4, for instance, the short circuiting contactor $Sch$ is then to be equipped with three separate release coils $A_k$ acting upon a common magnet core. Instead of the short-circuiting contactor $Sch$, any other protective circuit control means may be used suitable to secure an undelayed protection of the converter in response to a releasing current pulse from the secondary coils of the differential control device.

Figure 7:
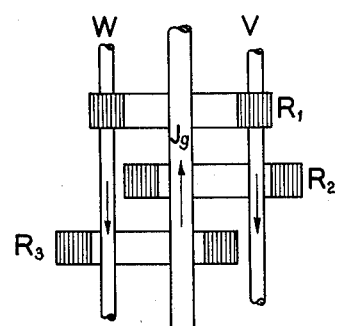
Figs. 7 and 8 show schematically a lateral view and a top view respectively of a modified device according to the invention.
Figure 8:
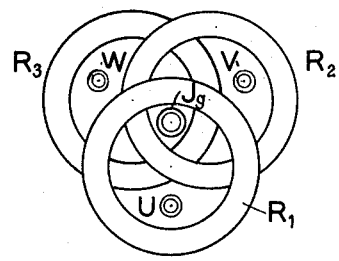

Figs. 7 and 8 illustrate another possibility of grouping the annular cores $R_1$, $R_2$, $R_3$. According to this modification, the annular cores $R_1$, $R_2$, $R_3$ all surrounding the straight direct-current bus, are displaced relative to one another so that the alternating-current conductors U, V and W pass through the respective cores without bending.

Preferably suitable for differentially controlled devices according to the invention are cores of the wound-up type, consisting of rolled, thin strips, wires or other strands of magnetizable material wound to form the annular body. However, the closed magnetic circuits of the control device may also be given a different shape and construction.

It will be obvious, that while Fig. 4 shows a three-phase half-wave rectifier system, the invention is similarly applicable to a full-wave arrangement according to the rectifier circuit of Fig. 1. The invention is furthermore applicable to rectifying circuits of the bridge type as will be explained presently with reference to the three-phase bridge circuit shown in Fig. 9 in its simplest fundamental form.

Figure 9:
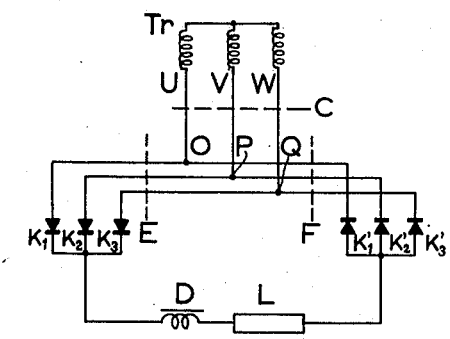
Fig. 9 is a basic circuit diagram of a bridge connected rectifier system and serves to explain the performance of devices according to the invention in systems of this type.

In Fig. 9 the reference characters used denote the same respective circuit components as in Fig. 4. The secondary phase conductors U, V, W of the transformer $T_r$ are connected at the branch points O, P and Q of the bridge with the valve units $K_1$, $K_2$, $K_3$, and also with the valve units $K'_1$, $K'_2$, $K'_3$ whose direction of conductivity is opposed to that of the units $K_1$, $K_2$, $K_3$.

As will be explained, a protective control device according to the invention may be inserted in such a bridge-type rectifier system at the place indicated by the broken line shown at C, or, instead, two such devices may be inserted at the places indicated in Fig. 9 by broken lines at E and F.

Figure 10:
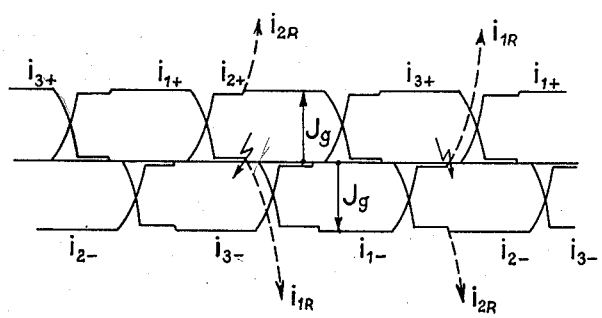
Fig. 10 is a coordinate diagram showing typical current curves as occurring in such a bridge-type rectifier system.

The phase currents occurring in a bridge-type rectifier system according to Fig. 9 are typified by the current curves shown in the coordinate diagram of Fig. 10 in which the abscissa denotes time while the ordinate represents current values. If a device according to the invention, for instance corresponding to Figs. 2 to 4, is inserted at the place C of Fig. 9 between the secondary windings of the transformer $T_r$ and the bridge points O, P, Q, two possibilities are to be distinguished. If an arc-back occurs at the step interval of a positive half wave, for instance at the end of the step interval of current $i_{1+}$, the performance is as described in the foregoing with reference to Fig. 4, and the releasing current pulse in the pertaining secondary winding commences immediately at the beginning of the arc-back. However, if the arc-back occurs at the end of the step interval of a negative half wave, for instance $i_{1-}$, the immediately commencing further increase of the forward current $i_{2R}$ is not of advantage because its tendency is to further increase the saturation of the pertaining magnetic core. Consequently, the releasing current pulse must now be produced by the core $R_1$ of the first phase (U). This, however, requires that the current $i_{1R}$ at first rise to the value of the then obtaining direct-current $J_g$ so as to nullify the resultant direct-current effects upon the core. Only the increase beyond the just-mentioned magnitude can effect a reverse magnetization of the core and hence the generation of a releasing current pulse in the pertaining secondary coil. It follows that in this case the time needed for the current $i_1$ to rise to the magnitude $J_g$ will elapse before the releasing current pulse is induced. Besides, the valve units of the rectifier, for instance the synchronous converter contacts, now have to conduct a current increased by the amount $J_g$ so that the extent of arc-back damage is also increased. Consequently, when inserting a differential device according to the invention at the place C of Fig. 9, it is not always possible to secure the same advantages as when including the device in a Y-connection according to Fig. 4.

For that reason, the insertion of the differential control device at the place C of Fig. 9 is usually applicable only with current converters of relatively low power rating i. e. in cases where the above mentioned retardation of the releasing impulses and the possibility of an increased current do not involve excessive detriments.

However, a protection equivalent to that obtainable in the three-phase Y-connection described in the foregoing with reference to Fig. 4 is obtained if two differential control devices are disposed at the respective places E and F of the bridge system according to Fig. 9. Then each of the two half portions of the bridge system represents in itself a three-phase Y-connection. Such a provision of two control devices, for instance according to Figs. 2, 3 or Figs. 7, 8, of course, requires a total of six closed-circuit magnet cores.

Figure 11:
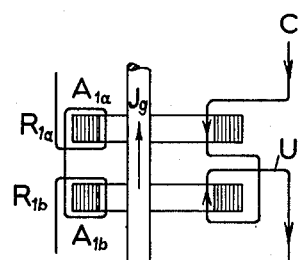
Figs. 11 and 12 show respectively two modifications of differential devices according to the invention applicable in bridge-type rectifier systems as typified in Fig. 9.

A protective system which operates with the same rapidity for each half-wave polarity can also be achieved with the aid of a single control device inserted at the place C of Fig. 9, if six cores are provided and if for each of the three phases (U, V, W) a pair of cores is arranged in the manner shown in Fig. 11 for one of these phases (U). The alternating-current conductor U passes through both cores $R_{1a}$ and $R_{1b}$ of the core pair but has a different winding sense for each core so that it subjects the two cores to fields of different respective directions. As a result, the occurrence of an arc-back then produces a voltage pulse either in the one secondary winding $A_{1a}$ or in the other secondary winding $A_{1b}$, and this pulse causes the protective contactor to operate in the manner already described.

Figure 12:
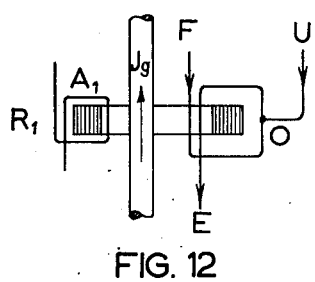

Another and preferred embodiment of the invention which avoids the duplication in the necessary number of cores is illustrated in Fig. 12. According to this embodiment, the closed magnetic circuits or cores are all passed through by the direct current, and each individual core is also subjected to the two valve currents flowing in respectively different directions through one of the respective input branch points of the bridge circuit. In Fig. 12, the core $R_1$ pertaining to the phase conductor U is illustrated in conjunction with the direct current conductor carrying the rectified load current $J_g$. The appertaining bridge lead between the points E and F is placed as a winding around the core, and the phase conductor U from transformer $T_r$ is connected to the center tap O of this bridge lead. Consequently, the point O is the branch point of the bridge (corresponding to point O in Fig. 9). The two other cores $R_2$ and $R_3$ (not shown in Fig. 12) are similarly connected to the phase conductors V, W and the corresponding bridge branch points P and Q. Such a device may require an only slight increase in core diameter for accommodating the second alternating-current conductor, but is capable of satisfying in three-phase bridge systems according to Fig. 9 the same favorable conditions as the three-phase Y-connection according to Fig. 4, with respect to the releasing speed as well as the magnitude of the valve unit current at the releasing moment.

The invention is similarly applicable to rectifier circuits having a different number of phases. Furthermore, the invention is not limited to contact converters but when applied to rectifiers of other types also secures the same advantage of securing an undelayed starting of the releasing pulse at the beginning of an arc-back current. The differential control device according to the invention, for instance, may be used with grid controlled mercury-arc rectifiers for releasing the fast operating relay for applying cut-off potential to the grid. The provision of one core in each of the respective phases then also affords a selective release of respective protective apparatus acting only upon the affected individual phase. It will further be obvious that the magnetic circuits for devices according to the invention may be given a shape and design other than specifically described in the foregoing and that various other modifications as regards details of the differential control devices and of the converter circuit connections may readily be applied, without departing from the essential features of the invention and within the scope of the claims annexed hereto.

I claim:

1. With an electric current converter, particularly a contact rectifier, having an alternating-current input circuit with a plurality of phase conductors, a direct-current load circuit, and disturbance-responsive protective circuit control means connected with said input circuit for interrupting the converter operation, the combination of a differential control device comprising a plurality of closed and normally saturated magnetic circuits of an essentially rectangular hysteresis characteristic, said magnetic circuits being all directly linked inductively with said direct-current load circuit and being individually and directly linked inductively with said respective phase conductors, said load circuit and the one phase conductor linked with each individual magnetic circuit having relative to said individual magnetic circuit respective ampere turns substantially in balance with each other during normal converter operation, and release control windings inductively linked with said respective magnetic circuits and connected with said circuit control means for supplying thereto a releasing current pulse due to occurrence of balance disturbing faults of converter operation.

2. In a combination according to claim 1, said converter having said phase conductors Y-connected with each other and having valve-type converter unit series connected with each of said respective phase conductors, one of said magnetic circuits being provided for each of said respective units.

3. In a combination according to claim 1, said converter having a power supply transformer secondarily connected to said phase conductors and having converter valve units interconnected to form a bridge circuit, said bridge circuit having branch points connected to said respective phase conductors, one of said magnetic circuits being linked with each of said respective phase conductors between said transformer and said respective branch points.

4. With an electric current converter, particularly a contact rectifier, having an alternating-current input circuit with a plurality of phase conductors, direct-current output buses, and disturbance-responsive protective circuit control means connected with said input circuit for interrupting the converter operation, the combination of a differential control device comprising a plurality of magnetizable annular cores, one of said direct-current buses passing through all of said cores and each of said phase conductors passing through one of said respective cores in opposed polarity relation to said one bus, said one bus and the one phase conductor passing through the same individual core having relative to said individual core respective ampere turns substantially in balance with each other during normal converter operation, and release control windings inductively linked with said respective cores and connected with said circuit control means for supplying thereto a releasing current pulse due to occurrence of balance disturbing faults of converter operation.

5. In a combination according to claim 1, converter having a power supply transformer secondarily connected to said phase conductors and having converter valve units interconnected to form a bridge circuit, said bridge circuit having branch points connected to said respective phase conductors, two of said magnetic circuits being correlated to each of said respective phase conductors between said branch points and said transformer, said direct-current load circuit being inductively linked with said two magnetic circuits of each phase conductor and having the same current flow direction relative to said two magnetic circuits, and each phase conductor being linked with said two pertaining magnetic circuits and having different current flow directions relative to said respective two magnetic circuits.

6. In combination, an electric current converter having interconnected rectifier units forming a bridge circuit having input branch points and output branch points, phase conductors connected with said respective input branch points, a power supply transformer secondarily connected with said phase conductors, direct-current buses connected to said output branch points, pairs of annular magnetizable cores, one of said direct-current buses passing through the two cores of each of said respective core pairs, each of said phase conductors passing through the two cores of one of said respective pairs and having relative to said one bus the same polarity in one of said two cores and the opposed polarity in said other core of said one pair, secondary windings disposed on said respective cores, and fault-responsive circuit means connected with said converter for interrupting its operation, said circuit means being connected with said secondary windings to be released by current induced in said windings.

7. In combination, an electric current converter having interconnected rectifier units forming a bridge circuit having input branch points and output branch points, phase conductors connected with said respective input branch points, a power supply transformer secondarily connected with said phase conductors, direct-current buses connected to said output branch points, a number of magnetizable cores equal to the number of said phase conductors, each of said cores forming a closed magnetic circuit and being traversed by one of said direct-current buses, said bridge circuit having two branch points to two of said units respectively, said two branch conductors extending through one of said respective cores in different current flow directions respectively, secondary windings disposed on said respective cores, and fault-responsive circuit means connected with said converter for interrupting its operation, said circuit means being connected with said secondary windings to be released by current induced in said windings.

8. In a combination according to claim 1, said release control windings of said respective magnetic circuits being series connected with each other.

9. In a combination according to claim 1, said protective circuit control means having electrically separate control circuits connected with said respective control windings of said magnetic circuits.

10. In a combination according to claim 1, said magnetic circuits having respective premagnetizing bias windings, and direct-current circuits connected with said respective bias windings to premagnetize said circuit in cumulative relation to the magnetization caused by said direct-current load circuit.

11. A differential release control device for protective apparatus of electric converters such as contact rectifiers, comprising a plurality of converter input conductors for plural-phase alternating current, a converter output conductor for rectified current, a plurality of closed magnetic circuits all linked inductively with said rectified-current conductor and individually linked inductively with said respective alternating-current conductors to be substantially balanced as regards the respective magnetomotive forces during normal converting operation, and respective release control windings having circuit means for connection to the protective apparatus and being inductively linked with said respective magnetic circuits to be induced by a releasing current pulse upon occurrence of magnetomotive-force balance affecting converter disturbance.

12. A differential release control device for protective apparatus of electric converters such as contact rectifiers, comprising a plurality of converter input conductors for plural-phase alternating current, a converter output conductor for rectified current, a plurality of annular magnetizable cores having respective control openings all traversed by said rectified-current conductor, each of said core openings being traversed by only one of said respective alternating-current conductors, said rectified-current conductor and each of said alternating-current conductors having opposing current-flow directions in each of said core openings so that each core is substantially balanced as regards the respective magnetomotive forces during normal converter operation, and respective release control windings having circuit means for connection to the protective apparatus and being inductively linked with said respective cores to be induced by a releasing current pulse upon occurrence of balance affecting converter disturbance.

13. A differential release control device for protective apparatus of electric converters such as contact rectifiers, comprising a plurality of converter input conductors for plural-phase alternating current, a converter output conductor for rectified current, a plurality of annular cores of a magnetizable material of an approximately rectangular hysteresis loop, said rectified-current conductor being passed through all said cores, each of said alternating-current conductors being inductively linked with one of said respective cores so that each core is substantially balanced as regards the respective magnetomotive forces during normal converter operation, and respective release control windings having circuit means for connection to the protective apparatus and being inductively linked with said respective cores to be induced by a releasing current pulse upon occurrence of balance affecting converter disturbance.

14. In a device according to claim 13, said cores consisting substantially of a wound body of thin strand material.

ERICH ROLF.

References Cited in the file of this patent

UNITED STATES PATENTS

| Number | Name | Date |
|---|---|---|
| 1,792,099 | Kern | Feb. 10, 1931 |
| 2,008,511 | McNairy | July 16, 1935 |
| 1,817,084 | Keller | Aug. 4, 1931 |
| 1,863,162 | Keller | June 14, 1932 |
| 2,434,214 | Lerstrup | Jan. 6, 1948 |
| 2,510,616 | Bany et al. | June 6, 1950 |